J. O'LEARY.
AUTOMOBILE FENDER.
APPLICATION FILED NOV. 1, 1913.
1,095,918.
Patented May 5, 1914.
2 SHEETS—SHEET 1.
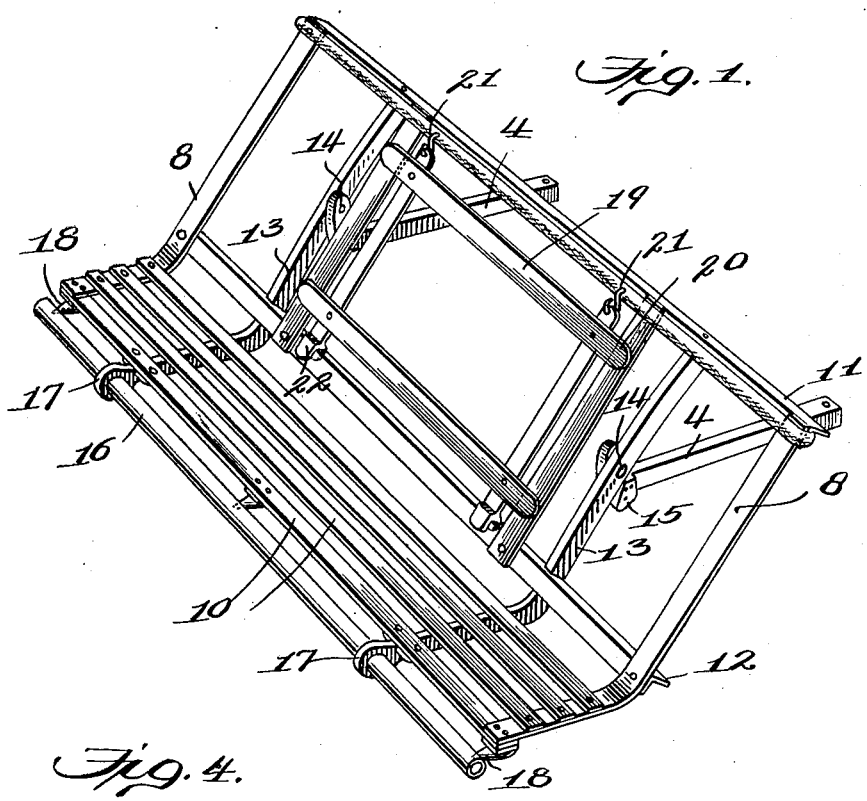
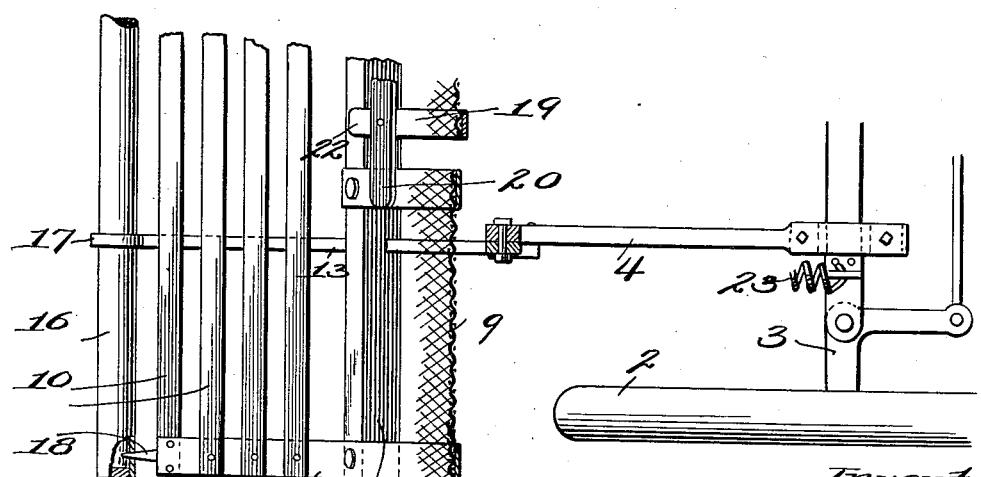
Witnesses:
Inventor
John O'Leary
by
James L. Norris,
Attorney.

J. O'LEARY.
AUTOMOBILE FENDER.
APPLICATION FILED NOV. 1, 1913.
1,095,918.
Patented May 5, 1914.
2 SHEETS—SHEET 2.
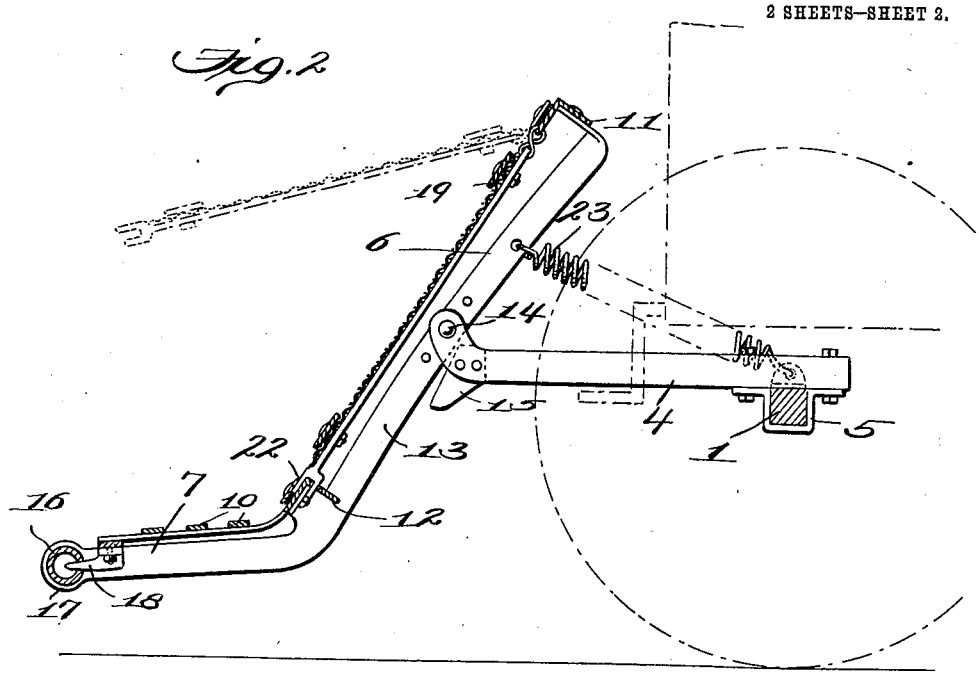
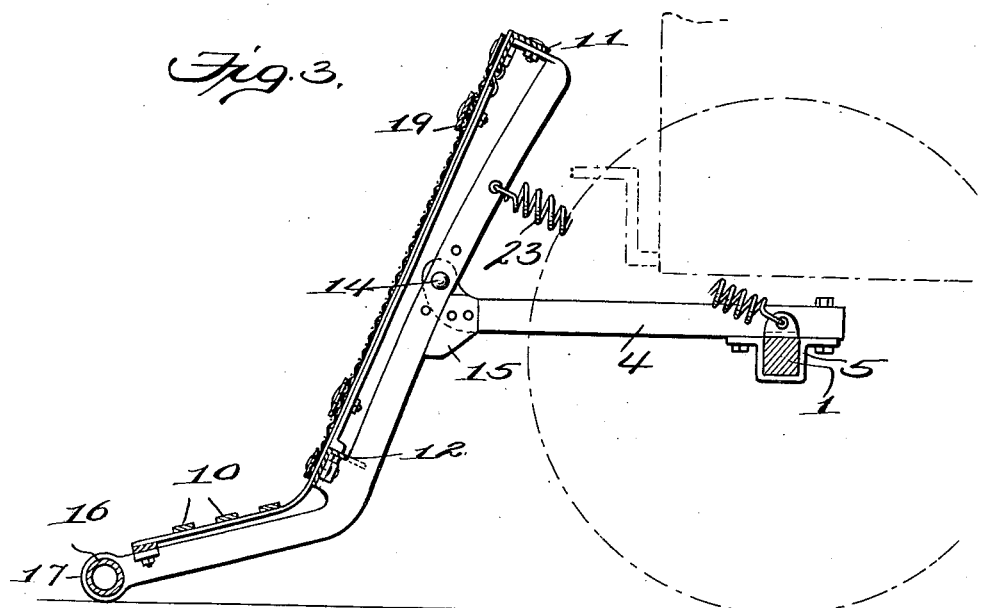
Witnesses:
Inventor
John O'Leary
by
James L. Norris,
Attorney.

UNITED STATES PATENT OFFICE.

JOHN O'LEARY, OF COHOES, NEW YORK.

AUTOMOBILE-FENDER.

1,095,918.     Specification of Letters Patent.     Patented May 5, 1914.

Application filed November 1, 1913. Serial No. 798,742.

*To all whom it may concern:*

Be it known that I, JOHN O'LEARY, a citizen of the United States, residing at Cohoes, in the county of Albany and State of New York, have invented new and useful Improvements in Automobile-Fenders, of which the following is a specification.

My present invention relates to improvements in fenders of the type adapted for use upon vehicles, and particularly automobiles, the same being an improvement upon that covered by my prior patent, No. 884,201, granted April 7, 1908.

The primary object of the invention is to provide a practical and efficient fender of this class which is capable of operating automatically and with certainty to prevent the wheels of the automobile or vehicle passing over the body of a person, the fender being so constructed and mounted that it cannot pass over such a body, and normally, the nose of the fender is above the surface of the street or roadway to afford the necessary clearance above obstructions, it being so supported on the automobile or vehicle that oscillation or vertical vibration thereof due to the passage of the automobile or vehicle over irregularities in the surface of street or roadway is reduced to a minimum or prevented.

To these and other ends, the invention consists in certain improvements, and combinations and arrangements of parts, all as will be hereinafter more fully described, the novel features being pointed out particularly in the claims at the end of the specification.

In the accompanying drawing:—Figure 1 is a perspective view of a fender constructed in accordance with the present invention; Figs. 2 and 3 show the fender applied to the front of an automobile, the fender being shown in section and in normal and actuated positions respectively; Fig. 4 is a top plan view, partly in section, showing one side of the fender and its support.

Similar parts are designated by the same reference characters in the several views.

Fenders embodying the present invention are capable of use upon vehicles of various types for the purpose of preventing passage of such vehicles over the body of a person.

The present invention provides a fender which is especially adapted for use upon automobiles, and while the preferred construction is shown in the accompanying drawing and will be hereinafter described in detail, it will be understood that the invention is not restricted to the precise construction shown, as equivalent constructions may be used and will be included within the scope of the appended claims.

In the present instance, 1 designates the front axle of an automobile and 2 designates the front wheel which may be mounted, as usual, on a steering knuckle 3 which is swiveled on the respective end of the front axle and is turned to direct the course of the automobile by the usual or any other suitable steering mechanism. The body or frame of the automobile is supported in the usual way by springs resting on the front and rear axles.

According to the present embodiment of the invention, the fender is supported directly by the front axle 1, a pair of supporting arms or brackets 4 being provided which are rigidly secured at their rear ends to the front axle, clips 5 being used for this purpose in the present instance, and these arms project forwardly a suitable distance and support the fender in advance of the front wheels.

Preferably, the fender embodies a guard section 6 and a ledge section 7, the guard section being inclined at a suitable angle downwardly and forwardly where it joins the ledge section, which latter normally extends forwardly in an approximately horizontal position. The guard and ledge sections of the fender are rigidly connected and are composed preferably of a framework made up of the marginal strips 8 at the sides, which may be of strap iron or other rigid material and are bent to the form of the fender. The guard section of the fender embodies an open-work structure 9, such as a wire mesh chain or net-work of suitable strength, and the ledge section of the fender embodies strips 10 which extend between and are secured at their ends to the marginal members 8, thus forming a support for the body of a person or other object encountered by the fender. The upper and lower edges of the open-work or mesh covering the guard section of the fender are preferably secured to upper and lower transverse angle irons 11 and 12. A pair of bars 13 are provided, which are secured firmly to the fender and are bent to conform to the angular relation of the guard and ledge sections thereof, and these bars serve to support the fender. In the present instance, these bars are pivotally mounted on the supporting arms, whereby the fender, upon encountering the body of a person or other object, may tilt downwardly to bring the forward edge or nose thereof upon the ground or surface of the roadway, the fender normally occupying a position with its forward edge or nose a suitable distance above the ground or roadway to afford the necessary clearance. As shown, the bars 13 are connected to the supporting arms 4 by pivots 14.

Means is provided for preventing the fender from buckling under the vehicle or from being pushed back out of place due to resistance encountered by the fender. In the construction shown, each supporting arm 4 is provided with a lug 15 which acts as a stop when the fender tilts downwardly to a position where its forward edge or nose is in engagement with the ground, the downward tilting of the fender being thereby limited and the stop sustaining backward pressure upon the fender. The lower or forward edge of the fender is provided in the present instance with a member, preferably in the form of a tube 16, which serves as a nose, this tube passing preferably through eyes 17 formed on the forward or lower ends of the bars 13, and a suitable number of projections 18 are provided which are secured to the ledge section of the fender and engage in apertures in the rear of the tube or nose 16, the nose being thereby held in proper position and is reinforced to prevent bending thereof.

In order to permit cranking of the motor by hand, a panel or door is provided which, when opened, renders the starting crank on the front of the automobile accessible. The door shown in the present instance embodies a frame 19 which may be covered by an open-work of mesh or the like, the horizontal members of the frame having extensions 20 which overlap portions of the frame of the guard section of the fender, and the framework of the panel is hinged or pivotally connected, preferably to the upper bar 11, by links, eyes or equivalent devices 21 which latter also permit limited vertical movement of the panel. The lower ends of the framework of the panel are formed with forks 22 which, when the panel is in closed position, straddle or otherwise engage the lower rail 12 and thereby hold the panel in closed position. To open the panel, the same is shifted vertically, this movement being permitted by the links 21, and in this way the forks 22 are disengaged from the rail 12. The panel is then free to swing upwardly, thereby providing an opening through which the starting crank of the automobile can be reached.

Normally, the fender is held yieldingly in a position with the nose or forward edge thereof elevated slightly above the surface of the ground or roadway, but when the fender encounters an object, such as the body of a person, either the weight of such body or the resistance offered thereby to the forward movement of the fender will cause the fender to swing downwardly about the pivots 14 as an axis until the nose of the fender is in contact with the ground or substantially so. In order to normally support the fender in elevated position, as shown in Fig. 2, tension springs 23 are provided, those shown being connected to the bars or members 13 of the fender at points somewhat above the pivots 14, and the rear ends of these springs are suitably attached to the axle. Owing to the rigid connection between the guard and ledge sections of the fender, upward deflection of the fender when the nose thereof encounters an object is avoided, the resistance offered when the nose of the fender encounters an object acting always to force the lower portion of the fender downwardly and rearwardly, thus rendering it impossible for the fender to pass over a body. Owing to the pivoted mounting for the fender, the latter is protected from vibration due to lunging or bounding of the automobile in passing over irregularities in the surface of the street or roadway. By supporting the fender directly from the front axle of an automobile, oscillation or vertical displacement of the fender is minimized and the fender will be held substantially at the correct elevation above the ground.

I claim as my invention:—

1. A fender for automobiles having a guard portion adapted to occupy a position in front of the automobile and provided with an opening to render accessible the starting crank, a panel hinged at the upper edge of said opening and capable of a swinging movement to close and uncover said opening and also capable of a lifting motion, and coöperative means at the lower edges of said opening and panel to secure the panel in closed position when the panel is in its lower position, said means being disengaged by the lifting of the panel.

2. A fender for automobiles having a guard portion and provided with an opening to render accessible the starting crank, a panel hinged to said guard portion at the upper edge of said opening and capable of relative vertical movement, and means for securing the panel in closed position embodying a bar on the guard portion and forked members on the panel normally engaging said bar and adapted to be disengaged therefrom by lifting of the panel.

In testimony whereof I have hereunto set my hand in presence of two subscribing witnesses.

JOHN O'LEARY.

Witnesses:
C. A. BATEMAN,
CHAS. S. HYER.

Copies of this patent may be obtained for five cents each, by addressing the "Commissioner of Patents, Washington, D. C."